(12) United States Patent
Bower, III et al.

(10) Patent No.: US 11,863,414 B1
(45) Date of Patent: Jan. 2, 2024

(54) RUNNING NETWORK DIAGNOSTICS ON A SERVER

(71) Applicant: Lenovo Enterprise Solutions (Singapore) Pte Ltd., Singapore (SG)

(72) Inventors: Fred Allison Bower, III, Durham, NC (US); Shyam Sareen, Cary, NC (US); Jarrod B Johnson, Raleigh, NC (US)

( * ) Notice: Subject to any disclaimer, the term of this patent is extended or adjusted under 35 U.S.C. 154(b) by 8 days.

(21) Appl. No.: 18/090,561

(22) Filed: Dec. 29, 2022

(51) Int. Cl.
  *H04L 43/08* (2022.01)
  *G06F 9/4401* (2018.01)

(52) U.S. Cl.
  CPC ............ *H04L 43/08* (2013.01); *G06F 9/4416* (2013.01)

(58) Field of Classification Search
  CPC .............................. H04L 43/08; G06F 9/4416
  See application file for complete search history.

(56) References Cited

U.S. PATENT DOCUMENTS

| | | | | |
|---|---|---|---|---|
| 10,489,232 B1* | 11/2019 | BeSerra | .............. | G06F 11/0709 |
| 2010/0049839 A1* | 2/2010 | Parker | .................... | H04L 43/00 |
| | | | | 709/221 |
| 2014/0195854 A1* | 7/2014 | Singh | .................. | G06F 11/2284 |
| | | | | 714/36 |
| 2015/0039939 A1* | 2/2015 | Zhang | ................. | G06F 11/2284 |
| | | | | 714/36 |
| 2015/0067420 A1* | 3/2015 | Suhas | .................... | G11C 29/08 |
| | | | | 714/722 |
| 2017/0024303 A1* | 1/2017 | Christopher | .......... | G06F 11/366 |
| 2018/0232331 A1* | 8/2018 | Huang | ................. | G06F 15/161 |
| 2018/0357108 A1* | 12/2018 | Mullender | .......... | G06F 9/45558 |
| 2019/0004901 A1* | 1/2019 | Ryan | ..................... | G06F 1/3253 |
| 2019/0012288 A1* | 1/2019 | Zhao | .................. | G06F 13/4282 |
| 2021/0286692 A1* | 9/2021 | Chien | ................. | G06F 11/2284 |

* cited by examiner

*Primary Examiner* — Kostas J Katsikis
(74) *Attorney, Agent, or Firm* — Jeffrey L. Streets

(57) ABSTRACT

A computer program product includes program instructions executable by a central processing unit (CPU) of a baseboard management controller (BMC) of a server to cause the BMC CPU to receive a message instructing the BMC to cause a host CPU on the server to run network diagnostics on a host network. The BMC CPU then instructs the host CPU to boot from a bootable image stored on a data storage device hosted by the BMC CPU and run a network diagnostic utility included with the bootable image to monitor network traffic on the host network physically connected to the server. In an alternative, the message instructs the BMC CPU to run network diagnostics on the host network. The BMC CPU then accesses and runs the network diagnostic utility to monitor and analyze traffic on the host network through a connection between the BMC and a host NIC on the server.

20 Claims, 5 Drawing Sheets

150

Receiving a message from a system management computer, wherein the message instructs the baseboard management controller of a server to cause a host central processing unit on the server to run network diagnostics on a host network physically connected to the server — 152

Instructing, in response to receiving the message, the host central processing unit to boot from a bootable image stored on a data storage device hosted by the baseboard management controller and run a network diagnostic utility included with the bootable image to monitor network traffic on the host network — 154

FIG. 6

160

Receiving a message from a system management computer, wherein the message instructs the baseboard management controller of a server to run network diagnostics on a host network physically connected to the server — 162

Accessing a network diagnostic utility — 164

Running the network diagnostic utility to monitor and analyze traffic on the host network through a direct physical connection between the baseboard management controller and a host network interface controller on the server — 166

FIG. 7

RUNNING NETWORK DIAGNOSTICS ON A SERVER

BACKGROUND

The present disclosure relates to the use of network diagnostic utilities in a computer network.

BACKGROUND OF THE RELATED ART

An unattended deployment of a single server or a cluster of servers may be performed in an edge location or a remote data center, respectively. These systems may already be physically deployed with connections to both electrical power and network infrastructure. However, one or more of the servers in these systems may fail to connect to the network. To diagnose a server that fails to connect to the network, a system or network administrative person may be required to deploy software tools on the server with the connection failure or on other equipment adjacent to the server with the connection failure. For example, the software tools may be deployed on a network switch, laptop computer, or another server in the same system with the server experiencing the connection failure. However, these techniques may require additional hardware and may often require the administrative person to be physically present with the server experiencing the connection failure to fully diagnose the one or more problems that have prevented the server from connecting to the network.

BRIEF SUMMARY

Some embodiments provide a computer program product comprising a non-volatile computer readable medium and non-transitory program instructions embodied therein, the program instructions being configured to be executable by a central processing unit of a baseboard management controller to cause the processor to perform various operations. The operations comprise receiving a message from a system management computer, wherein the message instructs the baseboard management controller of a server to cause a host central processing unit on the server to run network diagnostics on a host network physically connected to the server. The operations further comprise instructing, in response to receiving the message, the host central processing unit to boot from a bootable image stored on a data storage device hosted by the baseboard management controller and run a network diagnostic utility included with the bootable image to monitor network traffic on the host network.

Some embodiments provide a computer program product comprising a non-volatile computer readable medium and non-transitory program instructions embodied therein, the program instructions being configured to be executable by a central processing unit of a baseboard management controller to cause the processor to perform various operations. The operations comprise receiving a message from a system management computer, wherein the message instructs the baseboard management controller of a server to run network diagnostics on a host network physically connected to the server. The operations further comprise accessing a network diagnostic utility and running the network diagnostic utility to monitor and analyze traffic on the host network through a direct physical connection between the baseboard management controller and a host network interface controller on the server.

BRIEF DESCRIPTION OF THE SEVERAL VIEWS OF THE DRAWINGS

FIG. 6 is a flowchart of operations performed by a baseboard management controller of a server or edge computer according to some embodiments.

FIG. 7 is a flowchart of operations performed by a baseboard management controller of a server or edge computer according to some embodiments.

DETAILED DESCRIPTION

Figure 1:
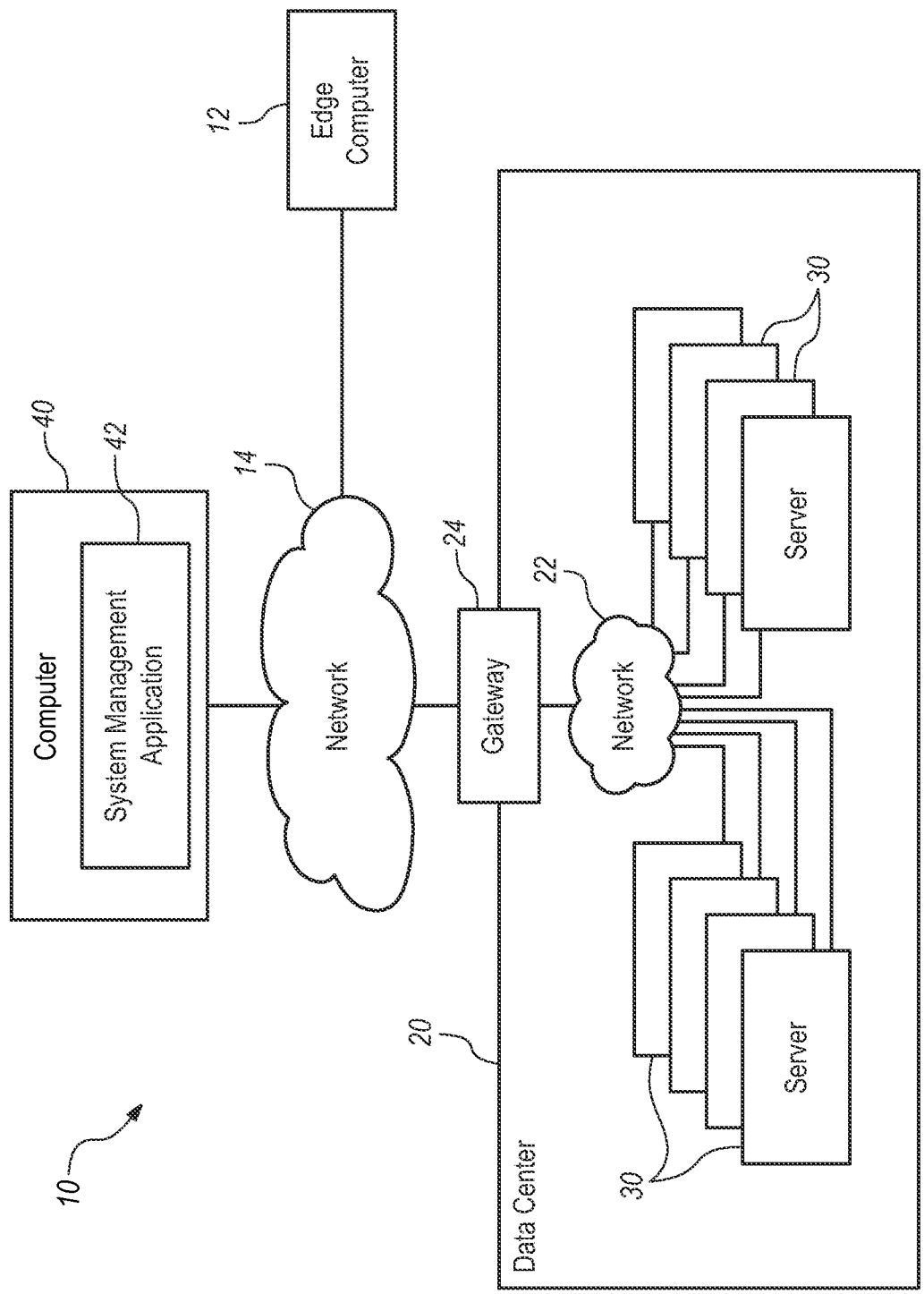
FIG. 1 is a diagram of a computer system in which some embodiments may be implemented.

Some embodiments provide a computer program product comprising a non-volatile computer readable medium and non-transitory program instructions embodied therein, the program instructions being configured to be executable by a central processing unit of a baseboard management controller to cause the processor to perform various operations. The operations comprise receiving a message from a system management computer, wherein the message instructs the baseboard management controller of a server to cause a host central processing unit on the server to run network diagnostics on a host network physically connected to the server. The operations further comprise instructing, in response to receiving the message, the host central processing unit to boot from a bootable image stored on a data storage device hosted by the baseboard management controller and run a network diagnostic utility included with the bootable image to monitor network traffic on the host network.

A baseboard management controller (BMC) is a small computer that resides on a motherboard of a server and some other devices, such as higher-end switches, to provide remote monitoring and control of the server. Redfish is the current standard used to expose the BMC functions as defined by the Distributed Management Task Force (DMTF) and largely replaces the older Intelligent Platform Management Interface (IPMI) standard. The BMC is a specialized microcontroller that is typically embedded on the motherboard of a computer server and has its own firmware and memory. The BMC manages the interface between system-management software and platform hardware BMC.

The BMC monitors the server hardware by receiving input from various sensors built into the server, including such input as component temperatures, cooling fan speeds, power status, and the like. Furthermore, the BMC can send alerts and operating data to a system administrator over a network under various conditions. The system administrator may also remotely communicate with the BMC to take some corrective actions, such as resetting or power cycling the server to get a hung operating system running again. Some BMCs may also have out-of-band embedded web-server interface functionality, enabling an administrator to monitor and take action via the BMC from a remote computer with a web-browser. Other out-of-band interfaces include an Intelligent Platform Management Interface (IPMI), Redfish interface, and Common Information Model (CIM) interface.

In some embodiments, the operations may further comprise the baseboard management controller communicating with the system management computer over a management network using a host network interface controller on the server. For example, the baseboard management controller may communicate via a direct physical connection with the host network interface controller using the Network Controller Sideband Interface (NC-SI) protocol. In some embodiments, the operations may further comprise the baseboard management controller communicating with the system management computer over a management network using a dedicated management network interface controller.

In some embodiments, the operations of the central processing unit of the baseboard management controller may further comprise receiving the bootable image from the system management computer and storing the bootable image on the data storage device hosted by the baseboard management controller. In one option, the baseboard management controller may receive and store the bootable image at some time prior to, or without regard to, a need to run network diagnostics on the host network. Specifically, the bootable image may be received and stored during initial setup of the server and/or other time period independent of the message instructing the baseboard management controller of the server to cause the host central processing unit on the server to run network diagnostics on the host network physically connected to the server. In another option, the baseboard management controller may receive the bootable image in association with a need to run network diagnostics on the host network. Specifically, the baseboard management controller may receive both the bootable image and the message during a single communication session.

In some embodiments, the server may be deployed in a remote data center or edge location, and the network diagnostic utility may be run in support of unattended deployment of the server in the host network under the control of the system management computer. While embodiments may be used in any environment and/or deployment scenario, embodiments may facilitate remote network diagnostics and unattended server deployment.

In some embodiments, the baseboard management controller may instruct the host central processing unit to boot from the bootable image and run the network diagnostic utility by communicating with the host central processing unit through a system bus within the server. This is made possible because the baseboard management controller is installed in the same server as the host central processing unit.

The network diagnostic utility may include any type and number of diagnostic utility utilities and may analyze any type of network activity. Without limitation, the network diagnostic utility may analyze Address Resolution Protocol (ARP) network activity, Service Location Protocol (SLP) network activity, Dynamic Host Configuration Protocol (DHCP) network activity, Link Layer Discovery Protocol (LLDP) network activity, and/or Internet Protocol version 6 (IPv6) Neighbor Discovery solicitations.

In some embodiments, the operations of the baseboard management controller may further comprise receiving network information from the host central processing unit running the network diagnostic utility, wherein the network information is obtained by the host central processing unit as a result of running the network diagnostic utility to monitor traffic on the host network. The scope and content of the network information may vary according to the one or more types of network diagnostic utilities that are run by the host central processing unit using the bootable image. The operations may further comprise causing the network information received from the host central processing unit to be stored. For example, the network information may be stored on a remote data storage device and/or on the data storage device hosted by the baseboard management controller. Still further, the operations may further comprise forming a network map using the network information received from the host central processing unit. In one option, the network map may include a network report, identified Subnets, identified virtual local area networks, and/or identified switch ports.

Some embodiments provide a computer program product comprising a non-volatile computer readable medium and non-transitory program instructions embodied therein, the program instructions being configured to be executable by a central processing unit of a baseboard management controller to cause the processor to perform various operations. The operations comprise receiving a message from a system management computer, wherein the message instructs the baseboard management controller of a server to run network diagnostics on a host network physically connected to the server. The operations further comprise accessing a network diagnostic utility and running the network diagnostic utility to monitor and analyze traffic on the host network through a direct physical connection between the baseboard management controller and a host network interface controller on the server. It should be recognized that this embodiment is distinct from some previously described embodiments in that the baseboard management controller runs the network diagnostics on the host network rather than instructing the host central processing unit to run the network diagnostics. However, other than this distinction, embodiments that run the network diagnostics on the baseboard management controller may include any one or more operations, aspects or features of the embodiments that run the network diagnostics on the host central processing unit. Therefore, a description of these operations, aspects or features may not be fully described again in the context of the network diagnostics being run by the baseboard management controller.

Some embodiments provide a technological benefit by enabling an administrative user with hardware management credentials to access the baseboard management controller to utilize the network diagnostic utility without requiring credentials to login to an operating system running on a host central processing unit of the server and/or without the operating system including the network diagnostic utility. It is a further technological benefit that some embodiments do not require the host computer to have a fully functional operating system. Although the host computer may in fact have a fully functional operating system, this is not required. In some embodiments, the host computer may eventually install an operating system, may be in the process of installing an operating system, or could already have an operating system installed, but embodiments can operate independent of whether or not the host is running its operating system. For example, a host CPU may be attempting to install the operating system or boot from a network resource (e.g., implementation of the Preboot eXecution Environment; "iPXE") but may not have the utilities that an operating system would need to diagnose a network problem. Furthermore, even if the host CPU is running an operating system, embodiments may still enable a hardware administrator to utilize network analysis tools even without authority or domain knowledge to login to the operating system. Further, an installed operating system may not have user-accessible network diagnostic utilities provisioned by default, yet those network diagnostic utilities may be provided according to some embodiments.

Embodiments include methods to enable a server to perform automated discovery of network information without requiring that the server have a pre-installed operating system on the server. For example, the network information may include subnet analysis of Address Resolution Protocol (ARP) traffic, observation of neighbor solicitations, and monitoring for SLP (Service Location Protocol), DHCP (Dynamic Host Configuration Protocol), or other relevant network activity.

A system that is "physically deployed" is connected to electrical power so that electrical power is provided to the baseboard management controller (BMC) and network interface controller (NIC), and preferably also provided to the host central processing unit (CPU) and main memory, and the system is also physically connected to a network. For example, a physical connection to a network may include an Ethernet cable or other wired connection.

A "failure to connect to the network" means that the primary network connection between the operating system (OS) run on the host CPU and a network is non-functional despite having a physical connection to the network. However, even though the server's host CPU may have a non-functional connection to the network, a baseboard management controller (BMC) on the same server may have a functional management network connection.

Some embodiments store a bootable image in data storage that is hosted by the baseboard management controller (BMC) and visible to the host CPU and memory subsystem. The bootable image can be accessed by the host CPU and memory subsystem so that the host CPU may boot from the bootable image and perform network analysis and diagnostics. For example, the BMC that hosts the bootable image may cause the host CPU to access the bootable image and then execute the bootable image. When the host CPU executes the bootable image, the bootable image causes the host CPU to run standard utilities to snoop the traffic on the available network interface(s).

The bootable image may be pre-installed on a data storage device hosted by the BMC or may be saved on the data storage device as needed. For example, the bootable image may be pushed from a computer running external management software to the BMC for storage in response to a need to perform the network diagnosis. However, the bootable image may be stored by the BMC to be run by the host CPU and memory subsystem, or to be run by the BMC itself.

Some examples of the standard utilities used by or included within the bootable image include ping, arping, tracert, ifconfig, wireshark, tcpdump, lldpd, lldpad. In addition, the bootable image may use custom code that talks directly to a raw socket.

"ping is a computer network administration software utility used to test the reachability of a host on an Internet Protocol (IP) network.

"arping" is a computer software tool for discovering and probing hosts on a computer network.

"tracerout" and "tracert" are computer network diagnostic commands for displaying possible routes and measuring transit delays of packets across an Internet Protocol (IP) network.

"ipconfig" is a console application program of some computer operating systems that displays all current TCP/IP network configuration values and refreshes Dynamic Host Configuration Protocol (DHCP) and Domain Name System (DNS) settings.

"wireshark" is a free and open-source packet analyzer.

"tcpdump" is a data-network packet analyzer computer program that runs under a command line interface.

"lldpd" is a daemon able to receive and second Link Layer Discovery Protocol (LLDP) frames.

"lldpad" a Link Layer Discovery Protocol (LLDP) agent daemon.

A map of the local network and its operating parameters may be determined using the information gathered from the traffic. For example, the information gathered from the traffic on the network may include subnet analysis of ARP traffic, observation of neighbor solicitations, and monitoring for SLP, DHCP, or other relevant network activity.

Some embodiments are implemented by servers having an internal communication connection from the host CPU to the BMC, which is typical of server implementations with a BMC present. This internal communication connection causes the host CPU to view the BMC as a network device, which facilitates a normalized communication interface for software to utilize. Using the internal network connection, the host CPU discovers the BMC-hosted storage as a device that looks like a USB flash drive that has been inserted into a USB port. The data storage device may be a component of the BMC subsystem, but the host CPU doesn't know or need to know the physical topology or implementation of the data storage device.

In some embodiments, the BMC has a physical connection to the host network interface controller. Use of the NC-SI (Network Controller Sideband Interface) interface specification and a compliant connection enables the BMC to communicate with the network interface controller (NIC) in a server to provide the BMC with access to the host network. In such configurations, the BMC may be able to directly monitor the traffic on the host network for the purpose of building the network map without the extra step of booting a network diagnostic image on the host CPU.

NC-SI defines a standard way for the BMC to share the physical Ethernet connection with the host CPU. Although network traffic flows through the same wire from the network to the network interface controller, an Ethernet controller chip may direct the network traffic to the proper endpoint within the server, such as the BMC or the host CPU. In this configuration, the diagnostic tools can be run on the BMC, since the BMC has a connection to the same Ethernet controller chip and Ethernet cable as the host CPU.

Some embodiments may, in conjunction with either of the disclosed configurations (i.e., either of the BMC or the host CPU running the network diagnostic utilities), use "passive" network interface monitoring and/or "active" network interface monitoring. Passive monitoring techniques observe traffic on the network without broadcasting any network traffic of their own. Active monitoring techniques emit network traffic that probes the network, for example by broadcasting a service request and monitoring for a response. For example, the network interface monitoring and analysis may include subnet analysis of ARP (Address Resolution Protocol) traffic, observation of neighbor solicitations, and monitoring for SLP (Service Location Protocol), DHCP (Dynamic Host Configuration Protocol), or other relevant network activity. DHCP requests are an example of an active monitoring technique. Some active monitoring techniques may trigger a response from malware or network attack detection utilities, so active monitoring techniques may not be preferred in some environments.

In some embodiments, the BMC may communicate over a "management network" that is distinct/separate from a "host network." These two networks may be supported by the same physical network wires/switches or by different physical network wires/switches if the BMC has its own dedicated network interface controller. Further, even in NC-SI supported configurations where the BMC has the capability to communicate with a host network via the system NIC, it is also possible for the BMC to utilize a network connection that is dedicated to the BMC. In other words, the presence of NC-SI does not require that the BMC make use of the NC-SI connection. In one option, the BMC may monitor and diagnose the host network using the NC-SI link to directly monitor network traffic, while communicating with system management through a dedicated management network interface.

Once a network map has been derived, the network map can be stored on the BMC-hosted storage or at a preconfigured remote destination and may be subsequently used to correct issues with a failing network connection process. Examples of a remote destination may include a central management server, one or more peer BMCs on systems sharing a common management sub-network, or a network debugging system. The network map information may include a network report and identified Subnets, Virtual Local Area Networks (VLANs), and Switchports. The network map may be derived or determined using information from ARP, SLP, DHCP and other network activity. Embodiments enable the BMC to perform network analysis or provide a bootable image that enables the CPU to perform this network analysis and are not directed to the details of the analysis itself.

In one option, network information may be obtained using Address Resolution Protocol (ARP) and Internet Protocol version 6 (IPv6) Neighbor Discovery. A host on the network may passively detect traffic from other hosts present on the network, then discern the subnets that are in use by well-configured systems without needing to "guess" the subnet or hosts that may respond. For example, if some ARP activity between 172.30.2.2 and 172.30.2.8 is detected, then this activity may suggest detecting at least 172.30.30.0/28. However, if the ARP activity later observes a 0.67 address, then this may suggest extending the detection to at least a /25. Some heuristic may be used to decide whether this later address is in the same subnet or potentially in multiple subnets. For example, when one party to an ARP transaction is in a confirmed detected range, only then assume continuity of subnet, or try to identify a free address near the target address and assume it for ARP query toward a detected network participant at increasingly large gaps in the subnet until the address is clearly no longer in the subnet.

In another option, network information may be obtained using Service Location Protocol (SLP) and Simple Service Discovery Protocol (SSDP). Peer systems may be more-confidently located on IPv6 link local and then query the located peers for various additional parameters. For example, an XClarity Controller (XCC), which is an expanded-capability replacement for a BMC that is offered by LENOVO, can be found on a subnet regardless of IPv4.

In yet another option, network information may be obtained using Link Layer Discovery Protocol (LLDP). When enabled on a network, LLDP provides a specific network location (per it's design point) in terms of switch name, switch port, and sometimes information like a Virtual Local Area Network (VLAN) identifier.

The network information may include a set of detected subnets. The set of detected subnets may be presented in a tabular form indicating networks that are in use. Furthermore, the detected subnets may be presented in a way that is adaptive to the presence or absence of any one or more protocols on each subnet. For example, the ARP is universally available, but is perhaps the least effective. On the other hand, a Dynamic Host Configuration Protocol (DHCP) offer is perhaps the simplest way to obtain the network information, but some networks may not allow a DHCP offer to be made to an unknown system or may have no DHCP server at all.

Embodiments may be implemented as part of a services package or -as-a-Service type offering or through system management portal. For example, embodiments may be implemented in a management-as-a-service system, network diagnostics-as-a-service system, or system deployment-as-a-service system.

In some embodiments, an administrative computer may issue an instruction to the BMC to cause the BMC to initiate diagnosis of network issues. An administrative computer may detect that a particular host has not established a host network connection and transmit the instruction to the BMC. The detection and the transmission of the instruction may be performed automatically by the administrative computer or with input from an administrative user.

In some embodiments, the BMC may make is own determination that the host has failed to establish a host network connection and then initiate diagnosis of network issues. Whether the diagnostics are initiated by an instruction from an administrative computer to the BMC or initiated by the BMC as a result of its own determination, the BMC may either cause the host CPU to load and run the network diagnostic utilities or the BMC may load and run the network diagnostic utilities itself.

In some embodiments, the BMC may provide the network information generated by the network diagnosis to an administrative computer so that an administrative user may further analyze the cause of the failed network connection and take steps to establish the network connection. Alternatively, the BMC may provide the network information, or some subset of the network information, to a workload running on the host CPU. However, providing network information to the host workload may be effective only if the host workload has the capability of interpreting the network information and adjusting settings to fix a problem identified using the network information.

The foregoing computer program products may further include program instructions for implementing or initiating any one or more aspects of the methods described herein. Accordingly, a separate description of the methods will not be duplicated in the context of a computer program product. Conversely, embodiments may include methods that include any one or more of the operations of the computer program products described herein and/or systems that perform any one or more of the operations of the computer program products described herein.

FIG. 1 is a diagram of a system 10 in which some embodiments may be implemented. The system 10 includes a datacenter 20 including a plurality of servers 30, a computer 40 running a system management application 42, and an edge computer 12. The plurality of servers 30 within the datacenter 20 may communicate over a local network 22. A gateway 24 may connect the local network 22 to an external network 14, such as the Internet. Accordingly, the system management computer 40 may establish communication with the edge computer 12 and/or any of the plurality of servers 30

Figure 2:
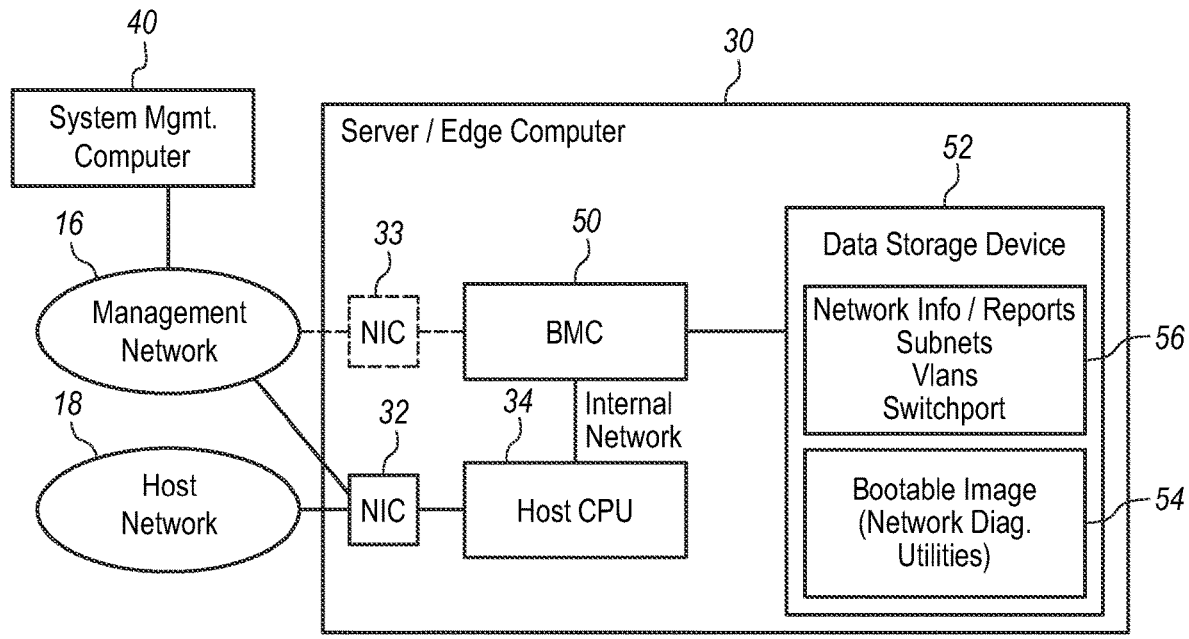
FIG. 2 is a diagram of a server or edge computer according to some embodiments.

FIG. 2 is a diagram of a server 30, which may also be representative of the architecture and operation of the edge computer 12, according to some embodiments. The server 30 includes both a host central processing unit (CPU) 34 and a baseboard management controller (BMC) 50. The CPU 34 and the BMC 50 are connected by an internal network, such as a system bus.

The BMC 50 hosts a data storage device 52. As illustrated, the data storage device 52 may store, among other things, a bootable image 54 that is used to perform network diagnostics and network information and reports 56.

The host CPU 34 is also connected to a network interfaces controller (NIC) 32 that enables communication to devices over a host network 18. In some embodiments, the BMC may also use the NIC 32 to communicate with devices, such as the system management controller 40, over the management network 16. Alternatively, the BMC 50 may have its own dedicated NIC 33 for communicating with devices over the management network 16.

In reference to previously described embodiments, the BMC 50 of the server 30 may receive a message from the system management computer 40, wherein the message instructs the baseboard management controller 50 of the server 30 to cause a host central processing unit 34 on the server to run network diagnostics on the host network 18 physically connected to the server. The baseboard management controller 50 may then instruct, in response to receiving the message, the host central processing unit 34 to boot from the bootable image 54 stored on the data storage device 52 hosted by the baseboard management controller and run a network diagnostic utility included with the bootable image 54 to monitor network traffic on the host network 18.

Figure 3:
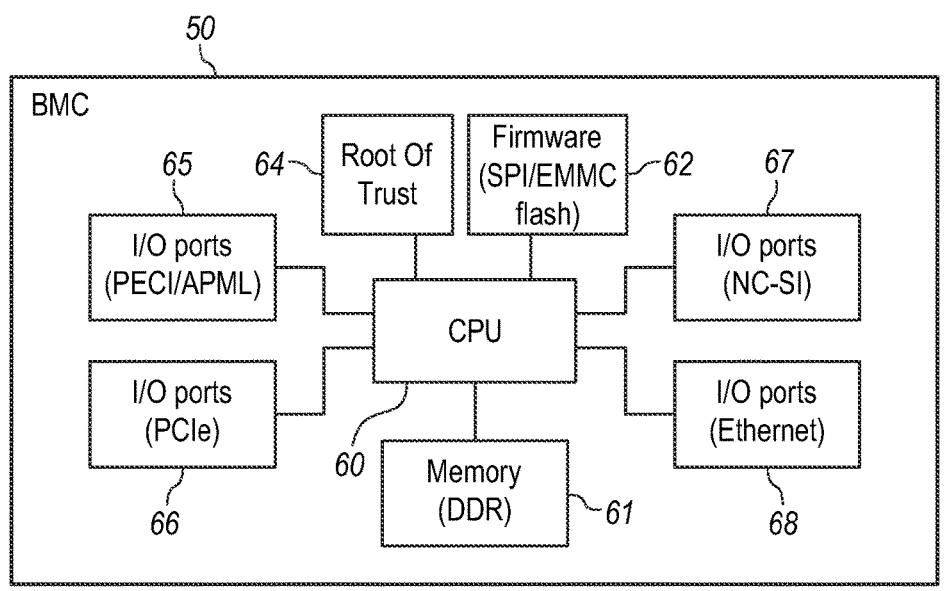
FIG. 3 is a diagram of a baseboard management controller (BMC) according to some embodiments.

FIG. 3 is a diagram of a baseboard management controller (BMC) 50 according to some embodiments. The BMC 50 is similar to a small computer or system on a chip (SoC), including a central processing unit (CPU) 60 (which is a separate entity from the central processing units 16, 17 in FIG. 1 and processor 104 of FIG. 6), memory 61 (such as random-access memory (RAM) on a double data rate (DDR) bus), firmware 62 on a flash memory (such as an embedded multi-media card (eMMC) flash memory or a serial peripheral interface (SPI) flash memory), and a root of trust (RoT) chip 64. The BMC 50 further includes a wide variety of input/output ports. For example, the input/output (I/O) ports may include I/O ports 65 to the hardware components of the server, such as a Platform Environment Control Interface (PECI) port and/or an Advanced Platform Management Link (APML) port; I/O ports 66 to the hardware components of the servers and/or a network interface controller (NIC), such as a Peripheral Component Interconnect Express (PCIe) port; I/O ports 67 to the NIC, such as a network controller sideband interface (NC-SI) port; and I/O ports 68 to a network that accessible to an external user, such as an Ethernet port. The BMC 50 may use any one or more of these I/O ports to interact with hardware devices installed on the server for purposes of monitoring and control.

Figure 4:
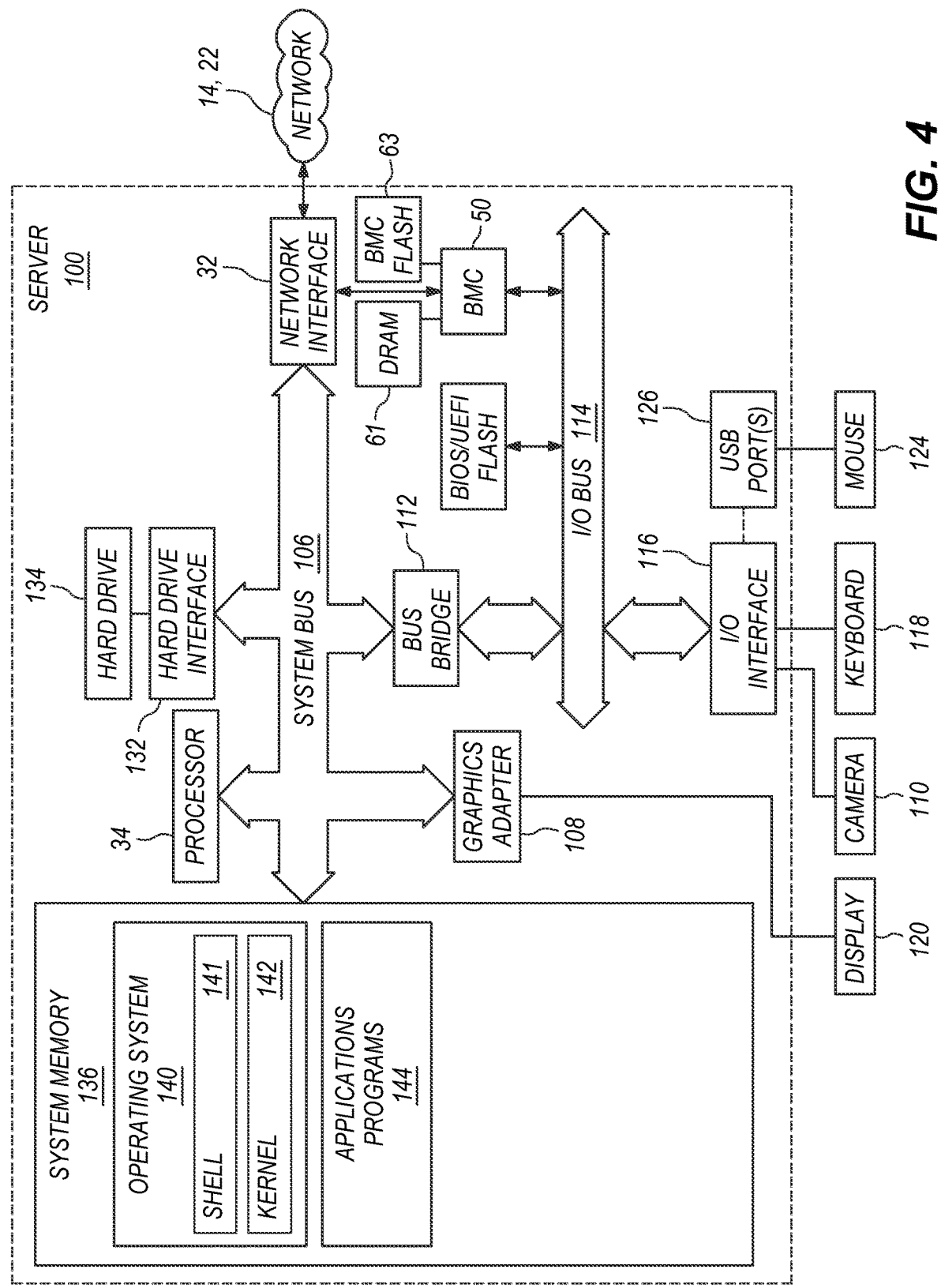
FIG. 4 is a diagram of a computer server according to some embodiments.

FIG. 4 is a diagram of a computer server 100 that may be representative of any of the servers 30, the system management computer 40, and/or the edge computer 12 shown in FIG. 1. The server 100 includes a processor unit 34 that is coupled to a system bus 106. The processor unit 104 may utilize one or more processors, each of which has one or more processor cores. An optional graphics adapter 108, which may drive/support an optional display 120, is also coupled to system bus 106. The graphics adapter 108 may, for example, include a graphics processing unit (GPU). The system bus 106 may be coupled via a bus bridge 112 to an input/output (I/O) bus 114. An I/O interface 116 is coupled to the I/O bus 114, where the I/O interface 116 affords a connection with various optional I/O devices, such as a camera 110, a keyboard 118 (such as a touch screen virtual keyboard), and a USB mouse 124 via USB port(s) 126 (or other type of pointing device, such as a trackpad). As depicted, the computer 100 is able to communicate with other network devices over a network 14, 22 using a network adapter or network interface controller 32.

A hard drive interface 132 is also coupled to the system bus 106. The hard drive interface 132 interfaces with a hard drive 134. In a preferred embodiment, the hard drive 134 may communicate with system memory 136, which is also coupled to the system bus 106. The system memory may be volatile or non-volatile and may include additional higher levels of volatile memory (not shown), including, but not limited to, cache memory, registers and buffers. Data that populates the system memory 136 may include the operating system (OS) 140 and application programs 144. The hardware elements depicted in the server 100 are not intended to be exhaustive, but rather are representative.

The operating system 114 includes a shell 141 for providing transparent user access to resources such as application programs 144. Generally, the shell 141 is a program that provides an interpreter and an interface between the user and the operating system. More specifically, the shell 141 may execute commands that are entered into a command line user interface or from a file. Thus, the shell 141, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 141 may be a text-based, line-oriented user interface, the present invention may support other user interface modes, such as graphical, voice, gestural, etc.

As depicted, the operating system 140 also includes the kernel 142, which includes lower levels of functionality for the operating system 140, including providing essential services required by other parts of the operating system 140 and application programs 144. Such essential services may include memory management, process and task management, disk management, and mouse and keyboard management. In addition, the computer server 100 may include application programs 144 stored in the system memory 136.

The server 100 may further include a baseboard management controller (BMC) 50. The BMC is considered to be an out-of-band controller and may monitor and control various components of the server 100. However, the BMC may also communicate with various devices via the network interface 32 and network(s) 14, 22. The BMC 50 is also shown hosting dynamic random-access memory (DRAM) 61 and flash memory 63.

Figure 5:
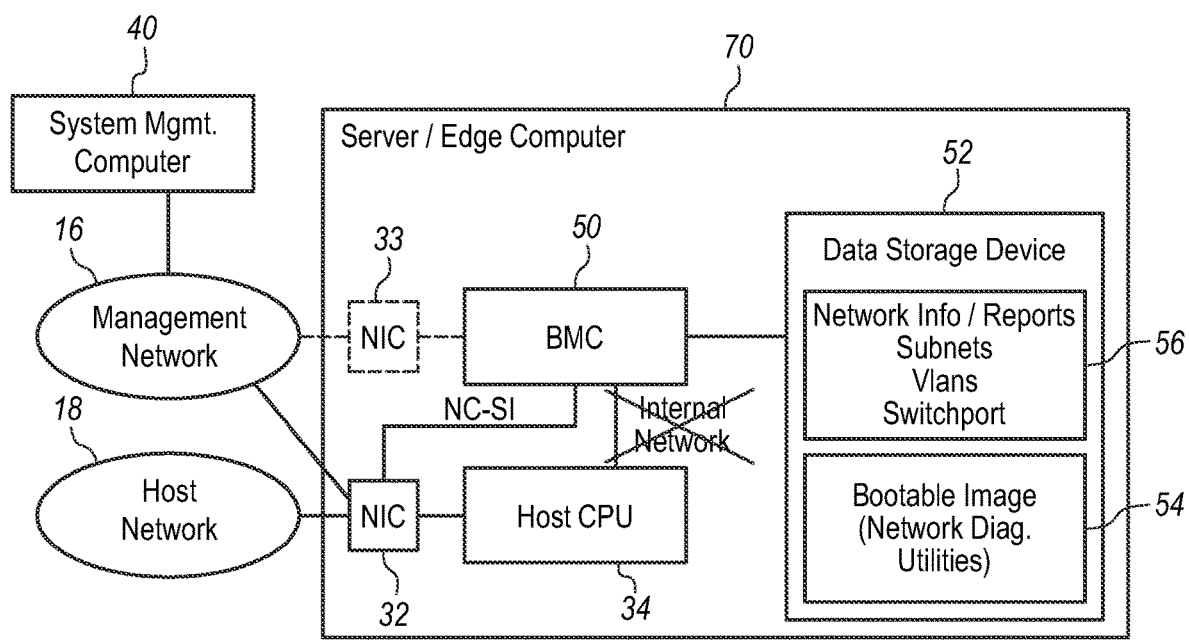
FIG. 5 is a diagram of a server or edge computer according to some embodiments.

FIG. 5 is a diagram of a server or edge computer 70 according to some embodiments. The server 70 includes many of the same components as described in reference to FIG. 2, which components are labeled with the same reference numbers used in reference to FIG. 2. In contrast to FIG. 2, the server 70 includes a network controller sideband interface (NC-SI) connection between the BMC 50 and the host NIC 32. The NC-SI connection enables the BMC 50 to communicate with the host NIC 32 in the server 70 to provide the BMC 50 with access to the host network 18. In such configurations, the BMC 50 may be able to directly monitor the traffic on the host network 18 for the purpose of building the network map without the extra step of booting a network diagnostic image on the host CPU 34.

In some embodiments, the BMC may use either the host NIC 32 or an optional dedicated NIC 33 to communicate over a "management network" that is distinct/separate from a "host network." These two networks may be supported by the same physical network wires/switches or by different physical network wires/switches if the BMC has its own dedicated network interface controller. Further, even in the NC-SI supported configuration of FIG. 5 where the BMC 50 has the capability to communicate with the host network 18 via the host NIC 32, it is also possible for the BMC 50 to utilize a network connection that is dedicated to the BMC. In other words, the presence of NC-SI does not require that the BMC make use of the NC-SI connection. In one option, the BMC 50 may monitor and diagnose the host network 18 using the NC-SI link to directly monitor network traffic, while communicating with a system management computer 40 through a dedicated management network interface controller 33.

The BMC 50 of the server 70 may receive a message from the system management computer 40, wherein the message instructs the BMC 50 of the server 70 to run network diagnostics 54 on the host network 18 physically connected to the server 70. Accordingly, the BMC 50 may access at least one network diagnostic utility 54 and run the at least one network diagnostic utility to monitor and analyze traffic on the host network 18 communicating through a direct physical connection (i.e., the NC-SI connection) between the baseboard management controller 50 and the host network interface controller 32 on the server 70. The same network information 56 may be gathered by host CPU 34 running the network diagnostic utilities 54 for the server 70 as described in reference to FIG. 5 as may be gathered by the BMC 50 running the network diagnostic utilities 54 for the server 30 as described in reference to FIG. 2.

FIG. 6 is a flowchart of operations 150 according to some embodiments. Operation 152 includes receiving a message from a system management computer, wherein the message instructs the baseboard management controller of a server to cause a host central processing unit on the server to run network diagnostics on a host network physically connected to the server. Operation 154 includes instructing, in response to receiving the message, the host central processing unit to boot from a bootable image stored on a data storage device hosted by the baseboard management controller and run a network diagnostic utility included with the bootable image to monitor network traffic on the host network.

FIG. 7 is a flowchart of operations 160 according to some embodiments. Operation 162 includes receiving a message from a system management computer, wherein the message instructs the baseboard management controller of a server to run network diagnostics on a host network physically connected to the server. Operation 164 includes accessing a network diagnostic utility and operation 166 includes running the network diagnostic utility to monitor and analyze traffic on the host network through a direct physical connection between the baseboard management controller and a host network interface controller on the server.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable storage device and non-transitory program instructions embodied therein, the program instructions being configured to be executable by a central processing unit of a baseboard management controller of a server to cause the baseboard management controller to perform operations comprising:
receiving a message from a system management computer, wherein the message instructs the baseboard management controller to cause a host central processing unit on the server to run network diagnostics on a host network physically connected to the server; and
instructing, in response to receiving the message, the host central processing unit to boot from a bootable image stored on a data storage device hosted by the baseboard management controller and run a network diagnostic utility included with the bootable image to monitor network traffic on the host network.

2. The computer program product of claim 1, the operations further comprising:
communicating with the system management computer over a management network using a host network interface controller on the server.

3. The computer program product of claim 1, the operations further comprising:
communicating with the system management computer over a management network using a dedicated management network interface controller.

4. The computer program product of claim 1, the operations further comprising:
receiving the bootable image from the system management computer; and
storing the bootable image on the data storage device hosted by the baseboard management controller.

5. The computer program product of claim 1, wherein the server is deployed in a remote data center or edge location, and wherein the network diagnostic utility is run in support of unattended deployment of the server in the host network under the control of the system management computer.

6. The computer program product of claim 1, wherein instructing the host central processing unit to boot from the bootable image and run the network diagnostic utility includes communicating with the host central processing unit through a system bus within the server.

7. The computer program product of claim 1, wherein the network diagnostic utility analyzes Address Resolution Protocol (ARP) network activity, Service Location Protocol (SLP) network activity, Dynamic Host Configuration Protocol (DHCP) network activity, Link Layer Discovery Protocol (LLDP) network activity, and/or Internet Protocol version 6 (IPv6) Neighbor Discovery solicitations.

8. The computer program product of claim 1, the operations further comprising:
receiving network information from the host central processing unit running the network diagnostic utility, wherein the network information is obtained by the host central processing unit as a result of running the network diagnostic utility to monitor traffic on the host network; and
causing the network information received from the host central processing unit to be stored.

9. The computer program product of claim 8, wherein the network information is stored on a remote data storage device.

10. The computer program product of claim 8, wherein the network information is stored on the data storage device hosted by the baseboard management controller.

11. The computer program product of claim 10, the operations further comprising:
forming a network map using the network information received from the host central processing unit.

12. The computer program product of claim 11, wherein the network map includes a network report, identified Subnets, identified virtual local area networks, and/or identified switch ports.

13. A computer program product comprising a non-volatile computer readable storage device and non-transitory program instructions embodied therein, the program instructions being configured to be executable by a central processing unit of a baseboard management controller of a server to cause the baseboard management controller to perform operations comprising:

receiving a message from a system management computer, wherein the message instructs the baseboard management controller to run network diagnostics on a host network physically connected to the server;

accessing a network diagnostic utility; and running the network diagnostic utility to monitor and analyze traffic on the host network communicating through a direct physical connection between the baseboard management controller and a host network interface controller on the server.

14. The computer program product of claim 13, wherein the network diagnostic utility is stored on a data storage device hosted by the baseboard management controller.

15. The computer program product of claim 13, wherein the network diagnostic utility is received from the system management computer.

16. The computer program product of claim 13, wherein the direct physical connection between the baseboard management controller and the host network interface controller uses a Network Controller Sideband Interface (NC-SI) protocol.

17. The computer program product of claim 13, the operations further comprising:

forming a network map using network information gathered by running the network diagnostic utility.

18. The computer program product of claim 13, wherein the network diagnostic utility performs automatic network discovery.

19. The computer program product of claim 14, wherein an administrative user with hardware management credentials to access the baseboard management controller may utilize the network diagnostic utility without requiring credentials to login to an operating system running on a host central processing unit of the server and/or without the operating system including the network diagnostic utility.

20. The computer program product of claim 14, wherein the server is deployed in a remote data center or edge location that does not include the system management computer, and wherein the network diagnostic utility is run in support of unattended deployment of the server in the host network under the control of the system management computer.

* * * * *